United States Patent [19]
Roos et al.

[11] Patent Number: 4,751,701
[45] Date of Patent: Jun. 14, 1988

[54] TDM COLLISION DETECTOR

[75] Inventors: David A. Roos, Gaithersburg; Robert A. Summers, Dayton, both of Md.

[73] Assignee: Hughes Network Systems, Inc., Germantown, Md.

[21] Appl. No.: 798,051

[22] Filed: Nov. 14, 1985

[51] Int. Cl.$^4$ ............................................. H04J 3/02
[52] U.S. Cl. .................................... 370/85; 340/825.5; 455/601
[58] Field of Search ................... 370/85, 92, 101, 108; 340/825.5, 825.77, 825.06; 375/94, 95, 113; 455/58, 601, 608

[56] References Cited

U.S. PATENT DOCUMENTS

| | | | |
|---|---|---|---|
| 4,063,220 | 12/1977 | Metcalfe et al. | 340/147 LP |
| 4,161,786 | 7/1979 | Hopkins et al. | 364/900 |
| 4,199,663 | 4/1980 | Herzog | 370/85 |
| 4,210,780 | 7/1980 | Hopkins et al. | 370/80 |
| 4,234,952 | 11/1980 | Gable et al. | 370/94 |
| 4,271,523 | 6/1981 | Gable | 371/57 |
| 4,292,623 | 9/1981 | Eswaran et al. | 340/147 R |
| 4,332,027 | 5/1982 | Malcolm et al. | 370/94 |
| 4,365,331 | 12/1982 | Biba et al. | 370/124 |
| 4,409,592 | 10/1983 | Hunt | 340/825.5 |
| 4,471,481 | 9/1984 | Shaw et al. | 370/85 |
| 4,479,228 | 10/1984 | Crane | 375/7 |
| 4,500,989 | 2/1985 | Dahod | 370/85 |
| 4,512,025 | 4/1985 | Frankel et al. | 375/36 |
| 4,519,074 | 5/1985 | Basile | 370/124 |
| 4,560,984 | 12/1985 | Scholl | 340/825.5 |
| 4,561,091 | 12/1985 | Scholl et al. | 370/85 |
| 4,561,118 | 12/1985 | Thinschmidt et al. | 455/608 |
| 4,584,678 | 4/1986 | Ozeki et al. | 370/85 |
| 4,598,285 | 7/1986 | Hoshen | 340/825.5 |
| 4,644,587 | 2/1987 | Takahashi et al. | 455/601 |
| 4,646,461 | 2/1987 | Usui | 455/601 |

OTHER PUBLICATIONS

Abraham et al., "Tradeoffs in the Design of Physical Layer Hardware for 10 MB/S CSMA/CD Networks", *Proceedings IEEE Infocom* 84, 1984, pp. 8–17.

Hopkins, "Multimode Communications on the MITRENET", *Proceedings of the LACN Symposium*, May 1979, 1979, pp. 169–176.

Lissack et al, "Digital Switching in Local Area Networks", *IEEE Communications Magazine*, May 1963, pp. 26–37.

Metcalfe et al, "Ethernet: Distributed Packet Switching for Local Computer Networks", *Computer Networks*, 1978, pp. 3–47 –3-56.

Takagi et al., "CSMA/CD with Deterministic Contention Resolution", *IEEE Journal on Selected Areas in Communications*, vol. SAC-1, No. 5, Nov. 1983, pp. 877–884.

*Primary Examiner*—Michael A. Masinick
*Assistant Examiner*—Stephen Chin
*Attorney, Agent, or Firm*—Pollock, Vande Sande & Priddy

[57] ABSTRACT

A collision detection mechanism includes a transmission protocol which locates a gap in a station's transmission, of fixed duration and position, relative to start of transmission. Collision detection is enhanced since random timing of collisions normally results in filling in the gap. This condition is more readily detectable than detecting the simultaneous presence of energy from two transmitters. The transmission protocol is followed unless the transmitting station detects a collision, in which event gap creation is inhibited. The gap detecting equipment may be located at a network head end.

16 Claims, 9 Drawing Sheets

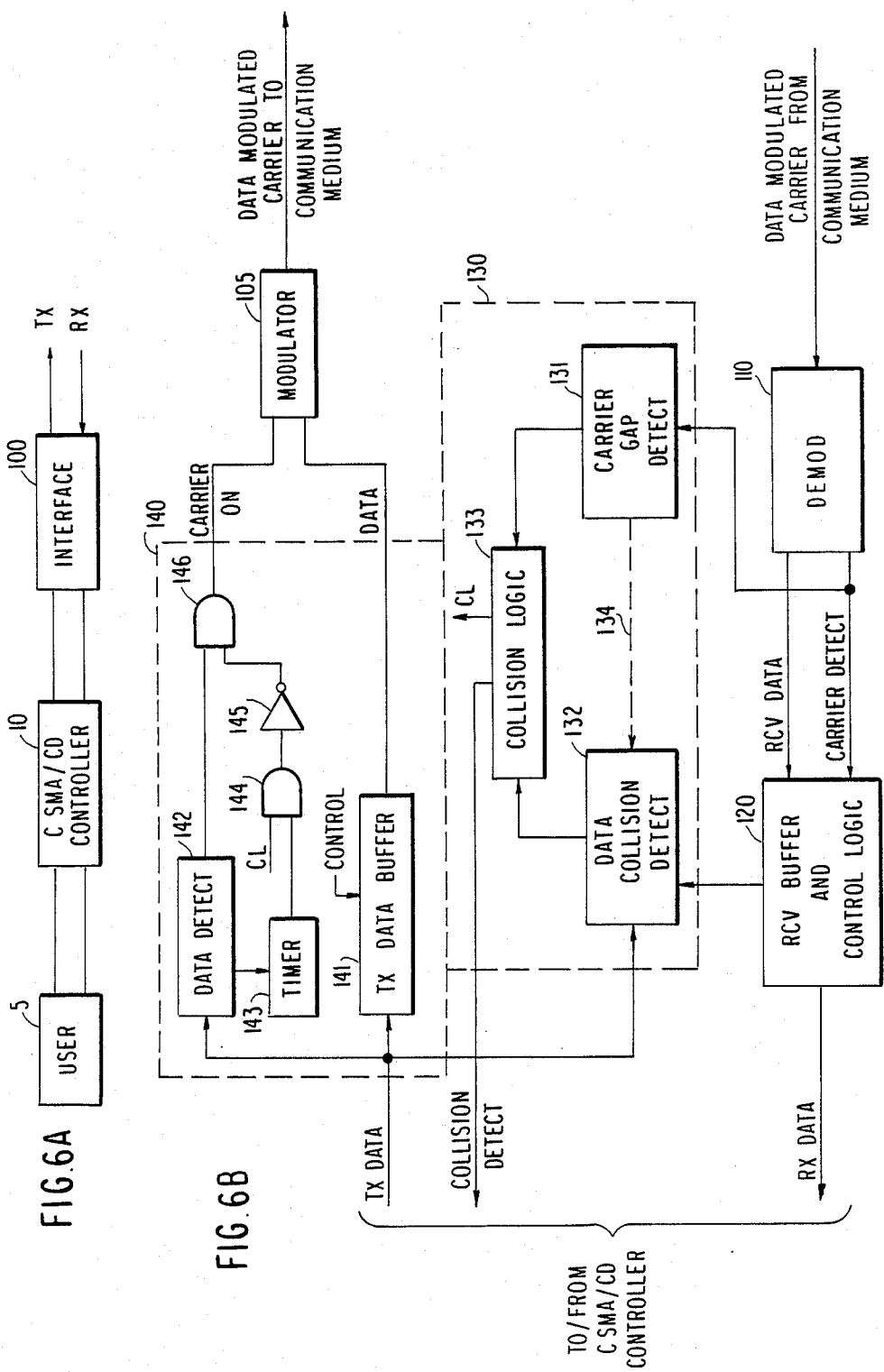

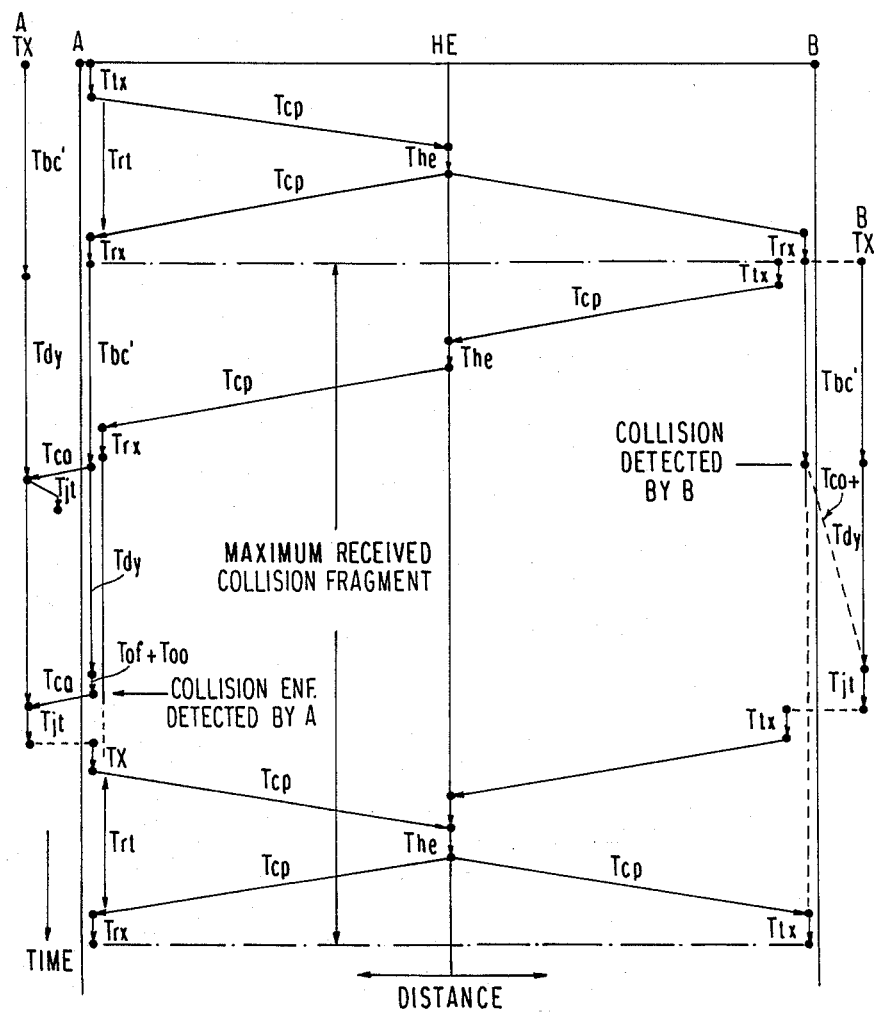
FIG. 7 — COLLISION SCENARIO 1. TRANSMITTERS A AND B AT CABLE PLANT EXTREMES.

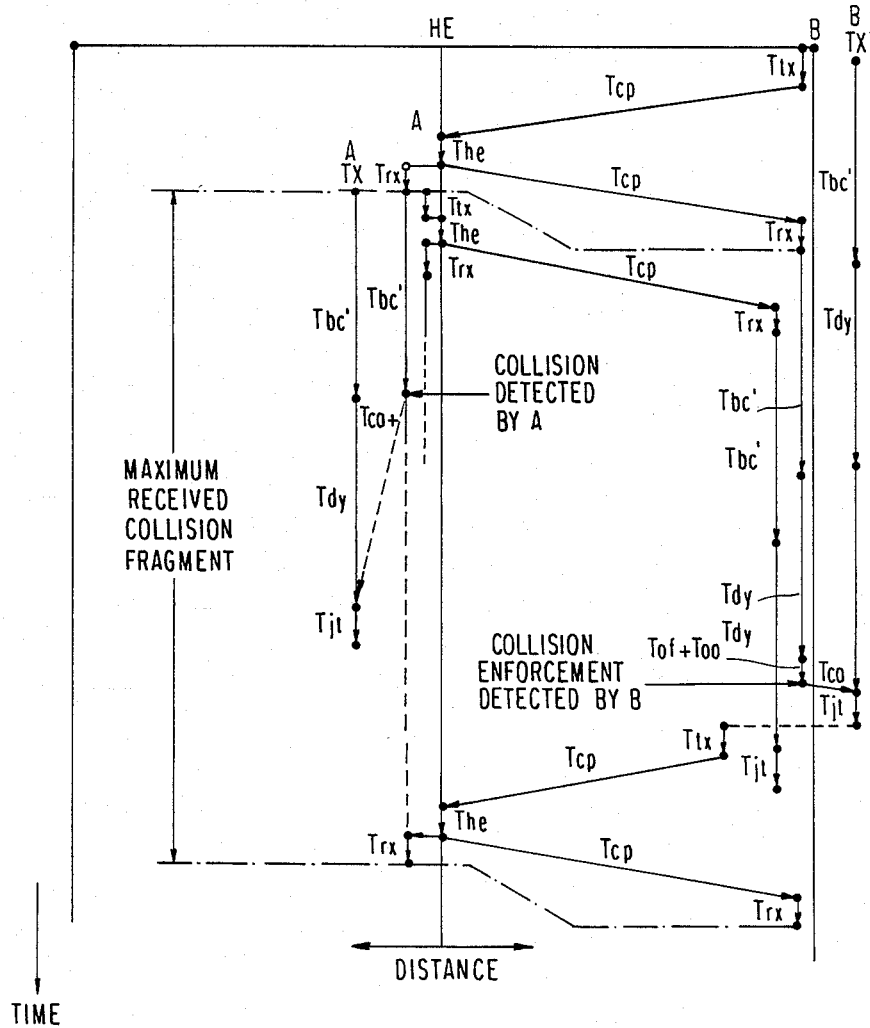
FIG. 8 — COLLISION SCENARIO 2.
TRANSMITTER A AT HEADEND AND
TRANSMITTER B AT CABLE PLANT EXTREME

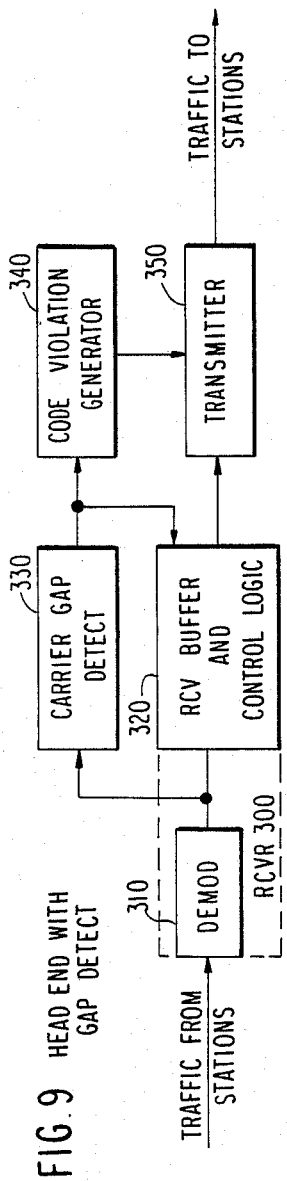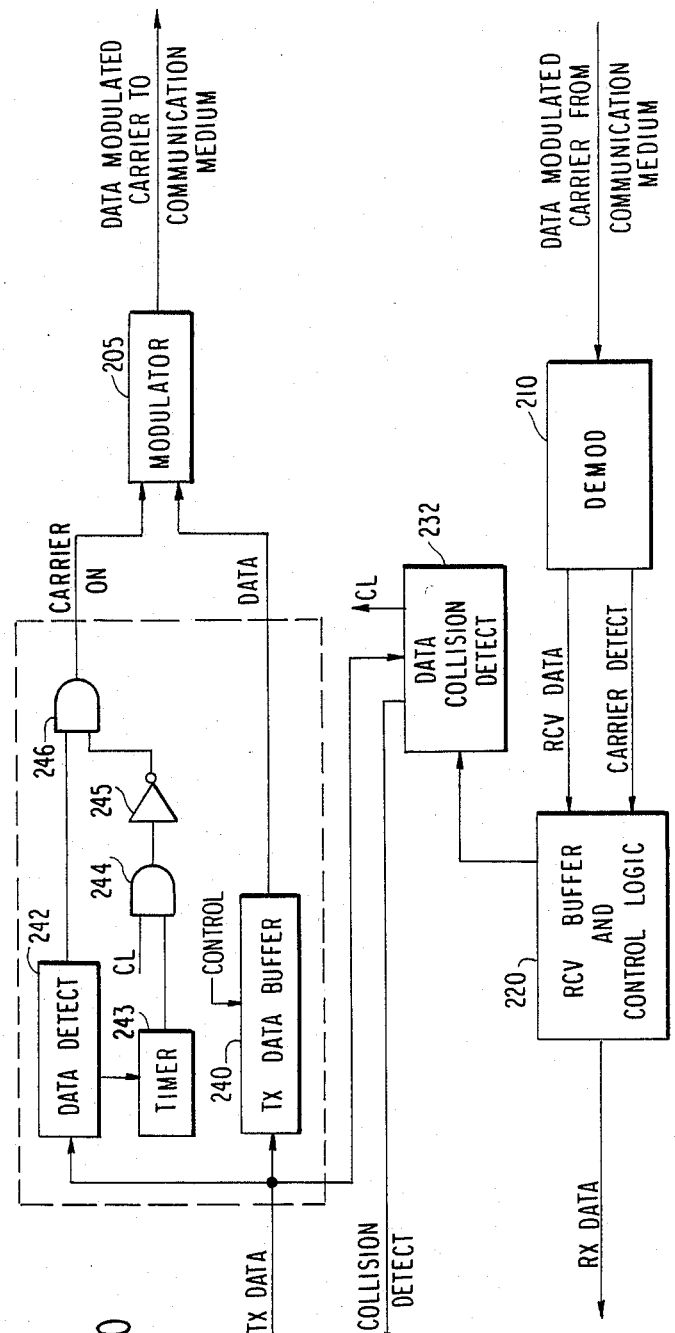
FIG. 9 HEAD END WITH GAP DETECT
FIG. 10

TDM COLLISION DETECTOR

DESCRIPTION

1. Technical Field

The present invention relates to carrier sense multiple access/collision detect communication networks, and more particularly, an improved collision detection mechanism which is especially suited for broadband networks, although it can be employed in baseband networks, as well.

2. Background Art

In a quest to reduce costs and increase efficiency, the communications field has seen the advent of a host of multiple access techniques for distributing the costs of fixed resources over as many users as possible. One of the most popular of these techniques is known as carrier sense multiple access, or CSMA. CSMA is a contention resolution technique which distributes control of a passive communication medium (which may be a free space RF communication channel, wire twisted pair, coaxial cable, optical fiber, or the like) by allowing any station with access to the medium to transmit to another station also with access to the same medium in a relatively uncontrolled fashion, e.g. as soon as it has data for transmission. In the event that two or more stations simultaneously or nearly simultaneously begin transmission, a so-called collision occurs which may and usually does corrupt both transmissions. The term "carrier sense" refers to a control mechanism which is used in this technique to reduce or eliminate these "collisions" by sensing, prior to initiating a transmission, the presence of another station's transmission to determine for example that the communication medium is "busy". It has become apparent, however, that mere carrier sensing is inadequate. As a result of the distributed nature of the communication medium, a first station, which is sufficiently far from a second station engaged in transmission, will not immediately detect the station engaging in transmission because of the propagation delay between the stations. Thus merely because the first station does not sense the second station's carrier for a period of time, it may begin its own transmission. With this scenario the correct receipt of the first station's transmission cannot be guaranteed. To at least detect these conditions, the art has developed a collision detector.

Conceptually, the collision detector is merely a device to compare the data being transmitted by a transmitting station, with the data detected by the transmitting station's receiver or to sense the presence of more than one transmission by energy level. In the event that no other station is transmitting (e.g. there is no collision) the comparison should be an equality or near equality (ignoring equipment delays in the receiving function) or the detected energy level is consistent with a single transmission.

The original form of CSMA/CD transmitted the data directly without modulation. An alternative to this direct or baseband technique is to modulate the data on an RF carrier before transmitting it, the latter or data modulated carrier network is referred to as broadband because it admits of the possibility of frequency division multiplexing. Conceptually, the use of baseband or broadband should make no difference to CSMA/CD because in both cases when a station has data to transmit, it first senses the state of the communication medium for someone else's transmission, and if no other transmission is detected, the station begins transmitting its own data.

The original description of the CSMA/CD network is apparently Metcalfe et al U.S. Pat. No. 4,063,220. Crane, in U.S. Pat. No. 4,479,228 describes some of the difficulties that he perceives in the Metcalfe et al description. Notable among them is his statement that methods of collision detection would have to be changed from the disclosed design for operation at high signalling rate (10 Mb/sec.) and for operation with AC coupled receivers.

Hunt, in U.S. Pat. No. 4,409,592, Eswaran, in U.S. Pat. No. 4,292,623, and Lissack et al, in "Digital Switching in Local Area Networks" in *IEEE Communications Magazine* (May 1983), pp. 26 et seq provide concise descriptions of developments in this field.

Malcom et al, in U.S. Pat. No. 4,332,027, describes some of the difficulties in implementing a collision detector. This patent as well as U.S. Pat. Nos. 4,199,663; 4,471,481 and 4,500,989 make reference to an intermessage gap which is used in a variety of ways. For example, U.S. Pat. Nos. 4,332,027; 4,199,663 and 4,471,481 provide each station with a unique delay from which to time from termination of the last transmission before the station is allowed to transmit. This appears to have some contention avoidance features. Takagi, in "CSMA/CD with Deterministic Contention Resolution" appearing in *IEEE Journal on Selected Areas in Communication,* Vol. SCA-1, #5 (11/83) at pp. 877 et seq. use intermessage gaps and direction dependent reception to increase efficiency.

The patents already described relate in the main to baseband techniques.

Hopkins et al, in U.S. Pat. Nos. 4,161,786 and 4,201,780 propose broadband networks. In the first-mentioned patent amplitude variations caused by multiple transmissions is used as a collision detection mechanism at a central location (e.g. the head end of a CATV system). In U.S. Pat. No. 4,210,780 a similar mechanism is employed at the interface of each station for collision detection. Hopkins et al note, in "Multimode Communications on the Mitrenet" appearing in *Proceedings of the LACN Symposium,* (May 1979) that baseband and broadband collision detectors are different.

U.S. Pat. Nos. 4,234,952; 4,271,523 and 4,365,331 describe different varieties of collision detection in a broadband network. The same is true of U.S. Pat. No. 4,519,074, which specifically mentioned the problems inherent in attempting collision detection in a broadband, FDM system. The patentee indicates that "When data is transmitted using FDM, the inherent properties of frequency modulation prohibit the detection of a colliding signal that is not close in amplitude to the locally transmitted signal. Until now, there has been no adequate system to reliably detect FDM collisions because the signal variations present on an FDM bus are sometimes quite large. The higher amplitude signal swamps out and prevents detection of the smaller amplitude signal." Frankel, in U.S. Pat. No. 4,512,025 quotes Klee et al to the effect that it has heretofore been deemed inconsistent to adapt a digital baseband network with collision detection prevention to any compatible broadband capability.

The speed with which a collision is detected has been determined to be important in increasing the efficiency of CSMA/CD systems. Once a collision occurs, any information transmitted by either of the transmitting stations will, because of the corruption, be wasted. Thus it is important to quickly detect the existence of a collision and to thereafter abort the transmission to avoid unduly wasting network time.

In baseband networks, where the communication medium is a cable or twisted pair, a collision is detected by observing the voltage on the conductor averaged over several bit times. When two or more stations transmit, the average voltage increases in magnitude thus indicating the presence of a collision. On the other hand, in broadband networks, the signal level change due to two or more transmissions is not always detectable because the signal levels need not be controlled to a narrow range of values. A weak station's transmission will not significantly alter the magnitude of a strong station's signal. Therefore, a method of reliably detecting collisions is required that is not dependent on closely maintained signal level tolerance. Up to the present time, the established collision detection mechanism for broadband networks has been the comparison, usually bit by bit, of the baseband data being transmitted with a demodulated version of the received data.

More particularly, in a broadband network, signal level is a function of transmit level, drop cable attenuation, tap value selection, trunk cable attenuation, temperature of the cable plant, amplifier gain variations and frequency. Although the design of a cable plant attempts to minimize the variations from port to port, the variables still contribute to variations in levels on the order of 20-30 dB when measured from any transmit port to any receive port. Therefore, the collision detection mechanism must be able to cope with such wide variations in signal level.

Working Group 802.3 of the IEEE has adopted a CSMA/CD standard for baseband networks, and a proposed standard for broadband networks is under consideration; the latter proposal uses the approach in Abraham et al, infra. This standard places a limit on the maximum time that can elapse from the beginning of a transmission at a station, to the time a collision must be detected at that station. The time required for detection of the collision is a function of the maximum distance between stations, the delay through the transceivers associated with each station, and the time required for the collision to be detected at the station. Accordingly, the collision detection mechanism must minimize the time required for propagation through the transceiver and the time required for detection of the collision in the transceiver, so that the distance between stations can be maximized.

In addition to efficiency, collision detection also impacts on the fairness with which the networks operates as well as on the possibility of lost transmissions due to undetected collisions. The problem in broadband systems occurs when a weak signal collides with a strong signal, typically in such a collision the strong signal "wins" and is favored over the weaker signal. Thus, the collision detection mechanism must ensure that all colliding stations, regardless of their level or position on the cable, will detect the collision.

A lost transmission can occur when two stations attempt to transmit to each other. The stronger station "wins" and therefore assumes that the other station correctly received its transmission. The weaker station, however, detected a collision and discarded the data that is received (that is the stronger station's transmission).

The conventional bit comparison collision detection mechanism has another failing in that collisions can only be detected by a station engaged in a transmission. Thus for example a receive only station may not be capable of detecting a collision. In addition, a network monitor (another form of receive only station) may also be incapable of detecting collisions.

In an attempt to partially eliminate this problem with prior art collision detection mechanisms, Abraham et al have suggested, in "Trade-Offs in the Design of Physical Layer Hardware for the 10 Mb/s CSMA/CD Networks Operating on CATV-Type Broadband Media" appearing in *Proceedings of The IEEE INFOCOM '84*, page 8 et seq, the use of a separate collision enforcement band. The collision enforcement band carries a collision enforcement signal (generated by any station detecting a collision) which lasts as long as the station detecting the collision continues to transmit. All stations in the network always monitor the collision enforcement band in addition to being tuned to the data carrying band. While the use of the dedicated collision enforcement band has the property of providing information respecting the presence of a collision to all stations in the network, it does have the disadvantages of consuming the bandwidth required (estimated at about 4 MHz, of a total 18 MHz for 10 Mbps data rate) for this band as well as consuming equipment dedicated to transmitting onto and receiving from the band. See also Metcalfe et al "Ethernet: Distributed Packet Switching for Local Computer Networks" in *Computer Networks* (1978) at pp. 3-47 et seq.

SUMMARY OF THE INVENTION

Thus it is an object of the invention to overcome the limitations of the prior art collision detection mechanisms.

It is another object of the present invention to provide a collision detection mechanism which will readily manifest the presence of a collision to every station in the network without requiring equipment dedicated to a collision enforcement band. These and other objects of the invention will become more apparent as this description proceeds.

The invention provides a method and apparatus for reliable collision detection in a CSMA/CD network. The invention relies on two allied mechanisms, the first is arranged to detect most collisions while the second ensures reliable detection by "enforcing" the collision detection so as to provide that information to all connected stations.

The first mechanism referred to above imposes an obligation on each transmitting station to insert a gap in the transmission at a predetermined point in its own transmission. The presence or absence of the gap is used to detect a collision. In a distributed system, each station is capable of determining the presence or absence of the gap. In a centralized approach, a single gap detector/eliminator is used. In a distributed system, stations receiving a transmission are arranged to expect to receive the gap at the predetermined point in the transmission. If two stations attempt to transmit at slightly different times, and each, in accordance with the invention, inserts the required gap in its own transmission, the transmission gaps of the two stations will be slightly offset from each other. Thus the gap of the first station will overlap a portion of the second. The result is that stations receiving these transmissions will fail to detect a gap, i.e. all or at least a portion of the first station's gap is filled in by the second station's transmission, and vice versa.

In an alternative, centralized approach, the network is arranged such that all transmissions are detected to a head end, which retransmits to all stations, the head end may include a gap detecting and eliminating function. If the gap is properly detected, head end received signals are repeated and the gap is eliminated. If the gap is not detected, or its boundaries are violated, the head end signals a collision using one of a number of techniques.

There is an instance in which it is possible for the first mechanism to fail to detect a collision. More specifically, when both stations transmit relatively simultaneously (to within some timing tolerance) the gap in the transmission of each station will be essentially identical in time. The term "relatively simultaneously" includes the time delay caused by separation of the transmitting stations. That is, to be relatively simultaneous two signals need not be transmitted absolutely simultaneously. If a further station transmits earlier, by just the delay caused by the propagation delay between stations, then the two transmissions will be relatively simultaneous. In that case, neither station fills in the gap in the other station's transmission. Accordingly, no collision can be detected by examining this gap. To prevent this collision from being overlooked, the second collision detection mechanism comes into play. The second collision detection mechanism is merely the prior art bit by bit comparison, effected at each transmitting station, of the baseband data being transmitted with a demodulated version of the received data. It is recognized that this second mechanism has the same disadvantage as that pointed out for the prior art, namely, in a stronger/weaker collision, the stronger station may not detect a collision. However, in such a collision there will always be a weaker station and the collision will be detected at the weaker station so long as the transmission from the two stations are different. This can be assumed as described below. At the weaker station, when a collision is detected by the second mechanism, the weaker station fills in its own gap, e.g. it does not transmit the gap. Thus the absence of the gap in the weaker station's transmission will "fill in" the gap in the stronger station's transmission. As a result all the receiving stations in the network will detect the lack of a gap and determine that a collision has occurred. The second mechanism operates as described for both distributed gap detectors and the centralized (head end) located gap detector.

In order to make the second mechanism effective, therefore, one is limited in selecting the location of the gap. More particularly, for efficiency purposes one would like the gap to be present as near the beginning the transmission as possible, so that collisions can be detected as early as possible and aborted. However, to ensure the practicability of the second detection mechanism the gap must be located late enough in the transmission to reliably detect (at least at one of the transmitting stations) the presence of the collision.

Typical packet transmission architectures provide at least two different fields in each packet, a header and the data itself. The header usually includes at least a unique source address. Thus in the case in which two stations transmit simultaneously or so nearly simultaneously that the difference in their transmission times cannot be detected (which possibility generates the need for the use of the second collision detection mechanism), the source addresses transmitted by each of the stations will be necessarily different. More generally, any bit sequence which is unique can be employed. Accordingly, in a preferred embodiment of the invention the carrier gap is located, in each transmission, beyond the source address. The length of the gap must be long enough to ensure that at a transmitting station, the carrier level can be dropped to a sufficiently low level and then later raised again so that the slot so formed can be reliably detected anywhere in the network. Depending upon the length of the gap it may be necessary to postpone continuing data transmission subsequent to the gap for the addition of a bit synchronizing interval.

Thus in accordance with the invention (distributed gap detection embodiment) a typical station in a CSMA/CD network includes user equipment coupled to a CSMA/CD controller which in turn is coupled to the communication medium via an interface. The interface includes a modulator and demodulator with conventional functions, namely the modulator converts data presented to it into a modulated RF signal suitable for presentation to the communication medium. The presence or absence of the RF carrier is controlled by a carrier-on signal also presented to the modulator. The demodulator converts the received RF signal into data and provides a signalling indicating the presence or absence of RF carrier. The demodulator will also effect conventional clock recovery.

The interface also includes a transmit data buffer, data presence detector and a timing and control section. This detects the beginning of a transmission (as signalled from the CSMA/CD controller) and asserts the carrier-on signal to the modulator. In response the modulator turns on its carrier. At a predetermined time thereafter (determined by the data rate and by consideration of CSMA/CD protocol which is being implemented) the data input to the modulator is stopped and the carrier-on signal is deasserted for a sufficiently long time that the carrier is completely turned off. During this time data is buffered so as not to be lost. Depending on the implementation the data may actually be buffered in the CSMA/CD controller or it may be buffered in the interface. The carrier-on signal is then reasserted thus ending a gap formed in the transmission. Data transmission is resumed although additional resynchronization bits may be added if needed. When the packet has been completely transmitted the carrier-on signal is deasserted. The transmit data buffer, etc. also responds to a collision enforcement signal (provided by apparatus to be described) which when asserted prevents the carrier on signal from being deasserted at the normal gap time. Thus in the presence of the collision enforcement signal carrier on is not deasserted and the gap is not created.

The interface further includes a data buffer and control logic. This accepts data from the demodulator, buffers it, strips any extraneous bits that may have been added during the transmission process and presents the data (with the gap having been filled in or detected) to the CSMA/CD controller. In addition, received data is presented to a data collision detector which is now described.

The data collision detector compares the data that is being transmitted to the data that is being received. Any differences between the two during a time window defined roughly by the beginning of reception to the location of the beginning of the transmitter gap is interpreted to be due to a collision of two or more signals on the communication medium. The result is the assertion of a data collision signal to a collision logic. The time window described above need only cover that portion of the transmission through the end of the source address or any other unique bit pattern.

A carrier gap collision detector is also provided which responds to the carrier detect signal from the demodulator. In particular, the carrier detect signal is examined for the presence or absence of the gap (or more precisely, energy in the gap) that should have been inserted in the transmitted RF signal. If the gap is not present (energy is present in the location when the gap is expected) a collision or collision enforcement is assumed. A carrier gap violation signal is asserted to the collision logic.

Finally, the collision logic responds to the carrier gap violation signal and the data collision signal, and in the presence of either, assets a collision enforcement signal to the transmit data buffer, etc.

In normal operation as a station begins its transmission, it sets a timer, the expiration of which will initiate the carrier gap. The duration of the carrier gap is also timed, so that the station's transmission includes a gap or a slot at a predetermined location of defined duration. In the absence of a collision, a receiving station detects a signal with the expected carrier gap. Normally a collision will result in the absence of a carrier gap since unless the colliding signals are almost (relatively) synchronous, one colliding signal will fill in the gap of the other and vice versa. The same result obtains even through there is a weaker/-stronger collision, that is a collision between stations whose signal levels are significantly different. The collision may not be detected by the stronger station but it will be detected by the weaker station. Collision detection by the weaker station will inhibit the gap in the weaker station's transmission and thus prevent overlooking the collision.

It is possible for two stations to transmit relatively simultaneously. In this case, the carrier gaps in the transmissions of each station would normally overlap so that the signal resulting from the collision would have the expected gap. However, each of the transmitting stations are also comparing the demodulated data they detect on the communication medium with the data they are themselves transmitting. By reason of the unique source addresses (or other unique bit pattern), at least one of the two colliding stations will detect a collision. This collision detection will prevent the station at which the collision is detected from providing a gap in its own transmission. The lack of the gap in one station's transmission is sufficient to fill in the gap in the other station's transmission. Thus through this collision enforcement mechanism, the gap is omitted and the collision is reliably detected throughout the network.

As described above, the gap detecting logic can reside at each station (distributed) or can reside at a head end (centralized). In the latter case, the head end can strip out the gap so that the various stations need not be concerned with the presence or absence of the gap.

Thus in accordance with the invention, a CSMA/CD network is provided including:

a plurality of stations communicating via a communication medium, each of said stations including an interface coupled between said medium and a CSMA/CD controller, said interface including transmitter means for transmitting onto said medium, said transmitter means including timing means for inserting a gap into a signal transmitted onto said medium at a predetermined location in each transmission, said network including at least one receiving means for receiving from said medium, and providing a receiver output representing a signal received from said medium, gap detecting means responsive to said receiver output for providing a collision detect signal in the event said receiver output fails to include said gap.

In accordance with another aspect, the invention provides, in a CSMA/CD network including a plurality of stations communicating via communication medium, each of said stations including an interface coupled between a CSMA/CD controller and said medium, said interface including: transmitting means for transmitting onto said medium, receiving means coupled to receive from said medium, and a collision detector coupled to both said transmitting and said receiving means, said collision detector comparing data for transmission with data output by said receiving means, and means responsive to lack of a collision detection for inhibiting transmission by said transmitter at a predetermined point in a transmission.

The invention also provides a transmitter for a CSMA/CD communication network including:

a carrier generator, timing means for timing a predetermined period from initiation of a transmission, logic means for controlling an operating condition of said carrier generator and responsive to expiration of said period and to an indication from a collision detector representing lack of collision detection for inhibiting said carrier generator for a predetermined duration beginning at the expiration of said predetermined period.

Finally, the invention provides an interface for a station in a CSMA/CD network coupled between a communicating medium of said network and a CSMA/CD controller, said interface including:

transmit controlling means responsive to a transmit enable signal from said CSMA/CD controller and to transmit data, for generating a carrier on control signal and for coupling transmit data to modulator means, modulator means responsive to said carrier on control signal and to said transmit data, and coupled to said communication medium, for energizing a carrier generator and modulating an output of said carrier generator with said transmit data to thereby provide a data modulated carrier to said communication medium, a data buffer, a demodulator responsive to data modulated carrier signals detected on said communication medium for providing a carrier detect control signal and for also providing demodulated receive data to said data buffer, a collision detector, said collision detector including a data collision detector responsive to receive data from said data buffer and transmit data from said transmit control means for providing a binary data collision, collision logic means responsive to said data collision signal for generating a collision enforcement signal in the presence of a data collision signal indicating the presence of a collision, said transmit control means including a gap generator for inhibiting said carrier on signal at a predetermined point in a transmission to provide a gap in said data modulated carrier, and gap generator control means responsive to said collision enforcement signal for preventing operation of said gap generator.

BRIEF DESCRIPTION OF THE DRAWINGS

The present invention will now be described in the following portions of this specification so as to enable those skilled in the art to make and use the same in connection with the attached drawings in which like reference characters indentify identical appratus and in which:

FIGS. 6A and 6B are respectively a block diagram of a typical station on a network, and a detailed block diagram of the interface 100 of FIG. 6A;

FIGS. 7 and 8 are time/distance diagrams showing two different collision scenarios;

FIG. 9 is a block diagram of head end equipment used in accordance with one embodiment of the invention; and FIG. 10 is a detailed block diagram of an interface 100 used in an embodiment of the invention corresponding to the embodiment of FIG. 9.

DESCRIPTION OF PREFERRED EMBODIMENTS

Figure 1A:
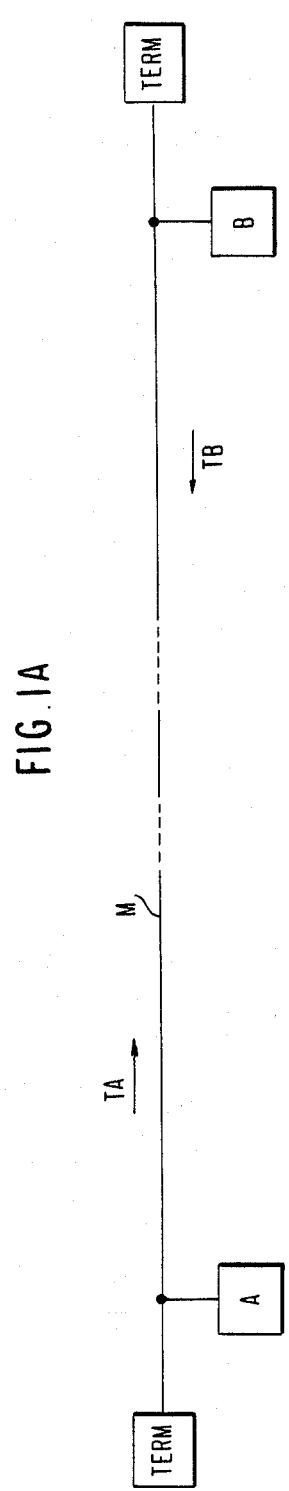
FIGS. 1A and 1B illustrate the topography of two different communication networks with which the invention may be employed.
Figure 1C:
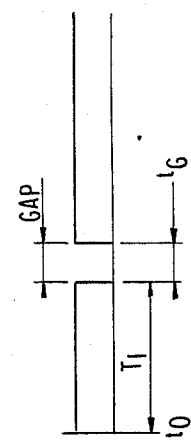
FIG. 1C illustrates the transmitter gap which is a feature of the invention.
Figure 1B:
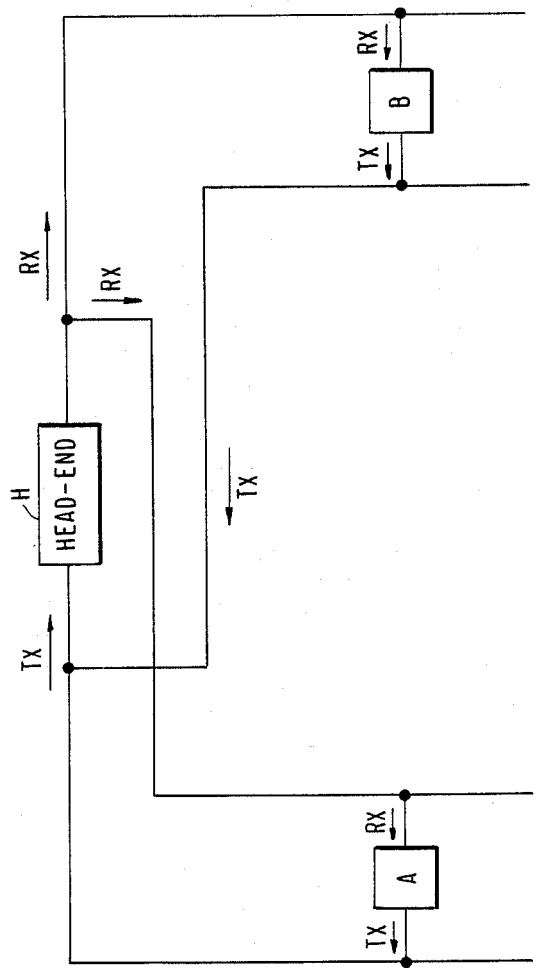

FIGS. 1A and 1B show two different forms of a communication network in which the communication medium is physically a conductor such as twisted pair, coaxial cable or optical fiber. As will become apparent as this description proceeds, the invention is also applicable to networks in which the communication medium is free space. FIGS. 1A and 1B show only two stations in the network, and in particular, two stations which are separated by a maximum distance in the network such that location of the stations define the extent of the network. In particular, FIG. 1A shows that stations A and B are coupled to a communication medium M such as a coaxial cable, which includes terminations T. The communicatio medium M may represent a cable or other transmission medium. Thus station A transmits in the direction $T_A$ and station B transmits in the opposite direction $T_B$. All stations receive from both directions.

FIG. 1B is a network which includes a pair of unidirectional cables and a head equipment H as is conventional in CATV applications. The head end may in fact include no equipment at all, it may include a simple frequency translator or it may include a remodulator. In some embodiments of the invention, the head end includes specialized equipment which plays a part in operation of the invention. Thus, both stations A and B transmit in the direction $T_X$ (in the direction toward the head end H) and both stations A and B receive from the head end H in the direction $R_X$. In the remainder of this description the invention will be described as applicable to the topography of FIG. 1B although as those skilled in the art will understand, the invention is also applicable to the topography of FIG. 1A.

The collision detection mechanism of the invention imposes an obligation on the transmitter of a station to insert a gap in its transmission. Refer to FIG. 1C which shows a typical transmission from a station as a function of time. The transmission begins at a time $t_o$. The transmission extends for a predetermined period ($T_1$) and at that point a gap (of duration $t_G$) is created in which the carrier is reduced to such a level that it cannot be detected and in fact its absence is reliably detected. At the termination of the gap, the carrier is reasserted. As a result, as a function of time, the transmission (see FIG. 1C) has a gap or a slot in it.

Figure 2:
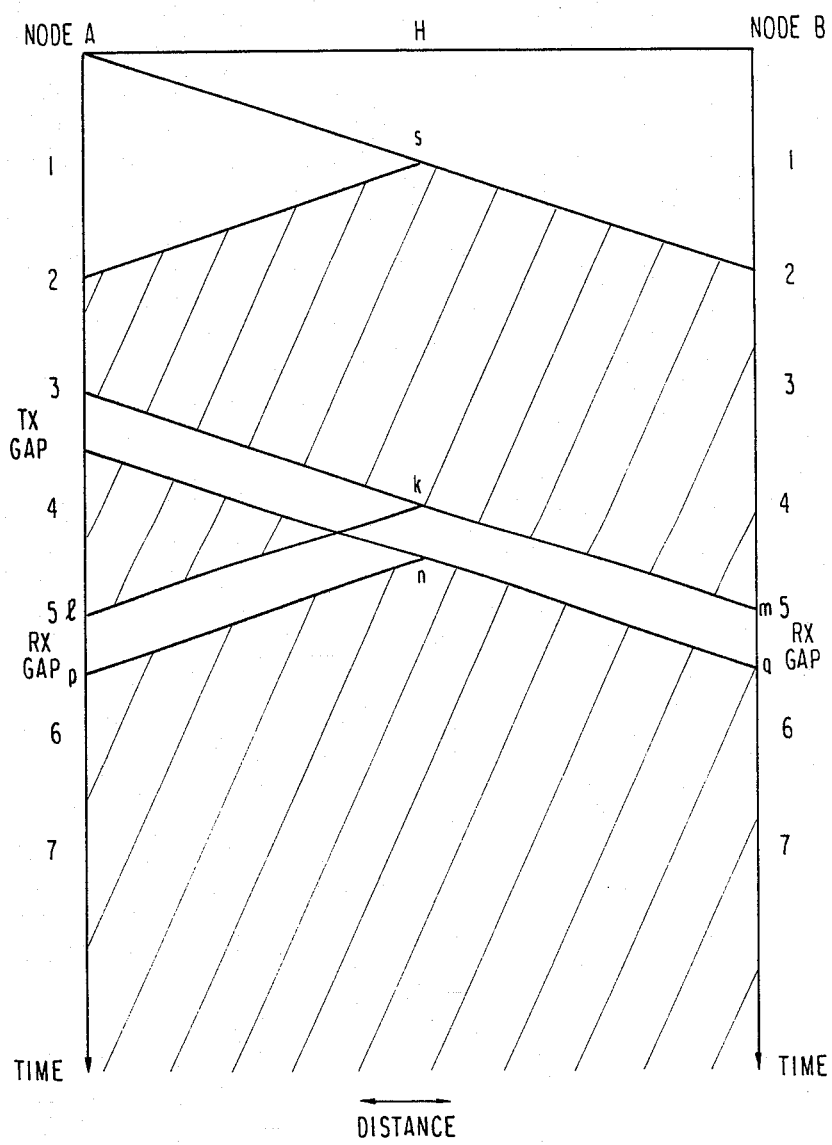
FIG. 2 is a time/distance diagram illustrating the signals propagating in the network of FIG. 1B, which is useful to explain how the transmitter gap is employed.

Reference is now made to FIG. 2 in which the distances from stations A and B are represented horizontally, so that the head end H exists at the mid-point, and time increases in a vertically downward direction. We assume at a time 0, station A begins transmission. At time 1, station A's transmission reaches the head end. Assuming that stations A and B are equally distant from the head end H, then the initiation of station A's transmission is detected at station B at a time 2. As will be clear hereinafter, the existence of equidistant stations A and B is merely for illustration, and it is in no way a limitation on the application of the invention. In any event, beginning at the same time 2, station A also begins to detect its own transmission returned from the head end H. FIG. 2 is drawn such that the gap in station A's transmission begins at a time 3 after initiation ($T_1=3$). Thus station A's transmission is momentarily interrupted (for the duration of the gap) and then begins again. As is shown in FIG. 2, stations A and B detects the gap in station A's transmission beginning at time 5. The shaded region of FIG. 2 shows that time during which a transmission exists on the receive cable $R_x$. Thus, until the transmission reaches the head end H (at s) there is no detectable signal. The transmission gap extends (in time) at the head end from k to n, at station A from 1 to p and at B from m to q. Since the gap in station A's transmission reaches the head end (at point k) the gap reaches station A's receiver at the point 1 and reaches station B's receiver at the point m, the gap occupies, in receiver time-space, the region lkmqnp. At all locations/time other than this region, A's transmission will be detected. At any location/time within this region, the gap will be detected.

Figure 3:
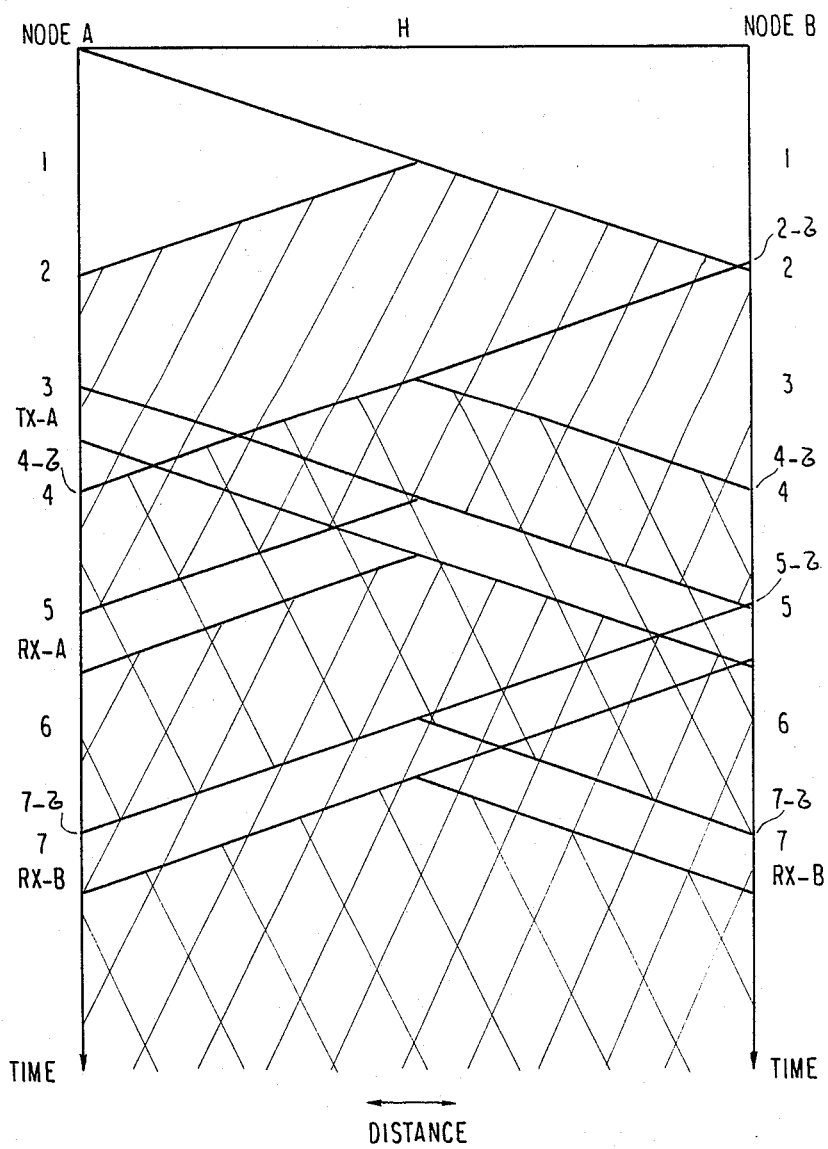
FIG. 3 is similar to FIG. 2 except that it illustrates how the transmitter gap can be used to detect collisions.

The ability of the inventive mechanism to detect collisions is illustrated in FIG. 3. FIG. 3 differs from FIG. 2 in that in addition to station A's transmission, FIG. 3 shows that station B begins transmitting just prior to receipt of A's transmission. At that time (2-δ, where δ is arbitrarily small) station B, sensing the absence of a carrier (since station A's transmission has not yet reached station B), validly begins transmittig. Thus at time 4-δ station B's transmission reaches station A.

Figure 4:
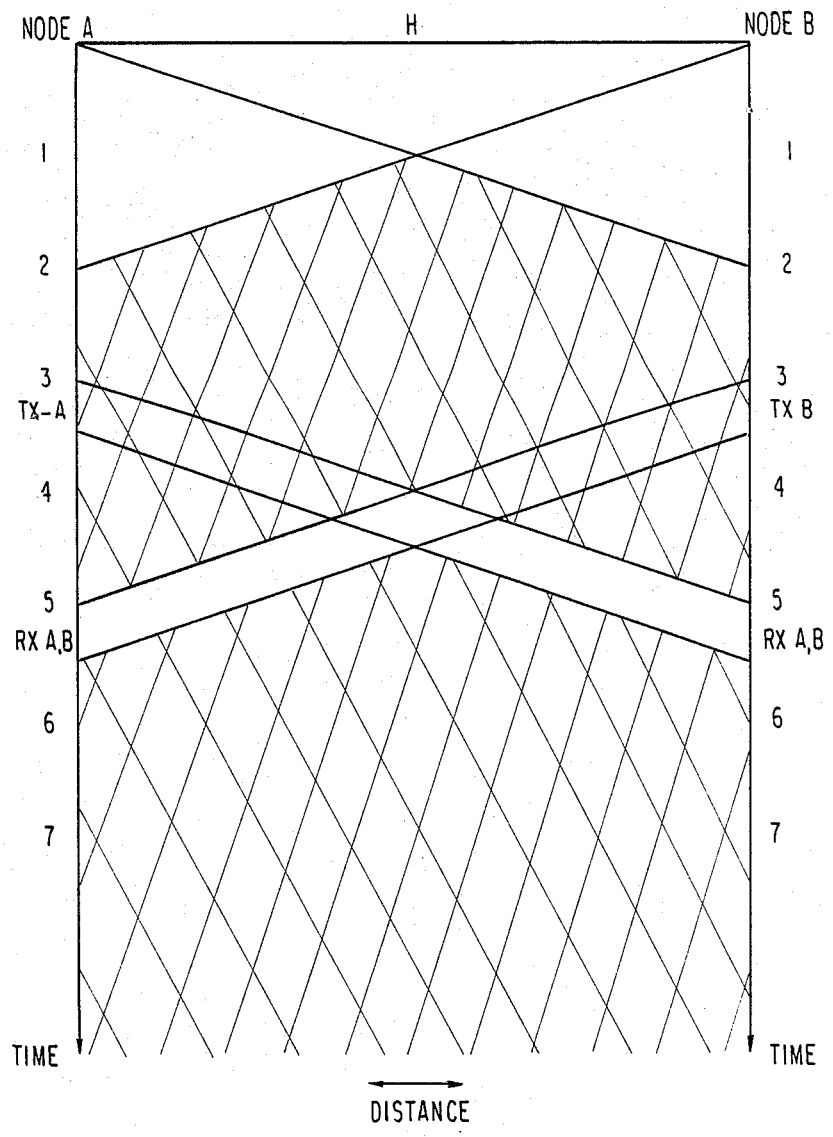
FIG. 4 is similar to FIGS. 2 and 3 except that it shows how the transmitter gap can be defeated.

Ignoring for the moment the second collision detection mechanism employed by the invention, and focusing on the first collision detection mechanism, the receipt at station A (at time 4-δ) of station B's transmission will have no effect on station A (or at least the first collision detection mechanism). Thus (and again ignoring the second collision detection mechanism) station A generates its transmitter gap beginning at time 3, and this transmitter gap reaches station B at arbitrary time 5. Station B's transmission gap begins at arbitrary time 5-δ. At that time of course station B is receiving a transmission it had earlier transmitted toward the head end. Thus, at arbitrary time 5 when station A's transmission gap reaches station B, station B does not ses a gap because it is simultaneously receiving its own transmission. What is true for station B will be true for any other station on the network, e.g. during the time when station A's transmission gap would otherwise be received, station B's transmission "fills" in the gap, and thus the carrier gap cannot be detected anywhere in receiver time/space; every receiver will detect a collision due to the absence of the gap. FIG. 4 is drawn for the case in which stations A and B simultaneously initiate transmission. As a result, they also simultaneously transmit the carrier gap. Thus as is shown in FIG. 4 throughout the network all stations will see the gap which they expect to see and in the absence of the second collision detection mechanism, which will be described below, this particular collision would remain undetected. Where stations (A and B) are equidistant from the head end, they must transmit absolutely simultaneously to achieve the condition shown in FIG. 4. However, for any other relationship (of distances between station A—head end and station B—head end) there is a time delay which if satisfied will produce the situation illustrated in FIG. 4 (that is the transmissions are relatively simultaneous).

Figure 5:
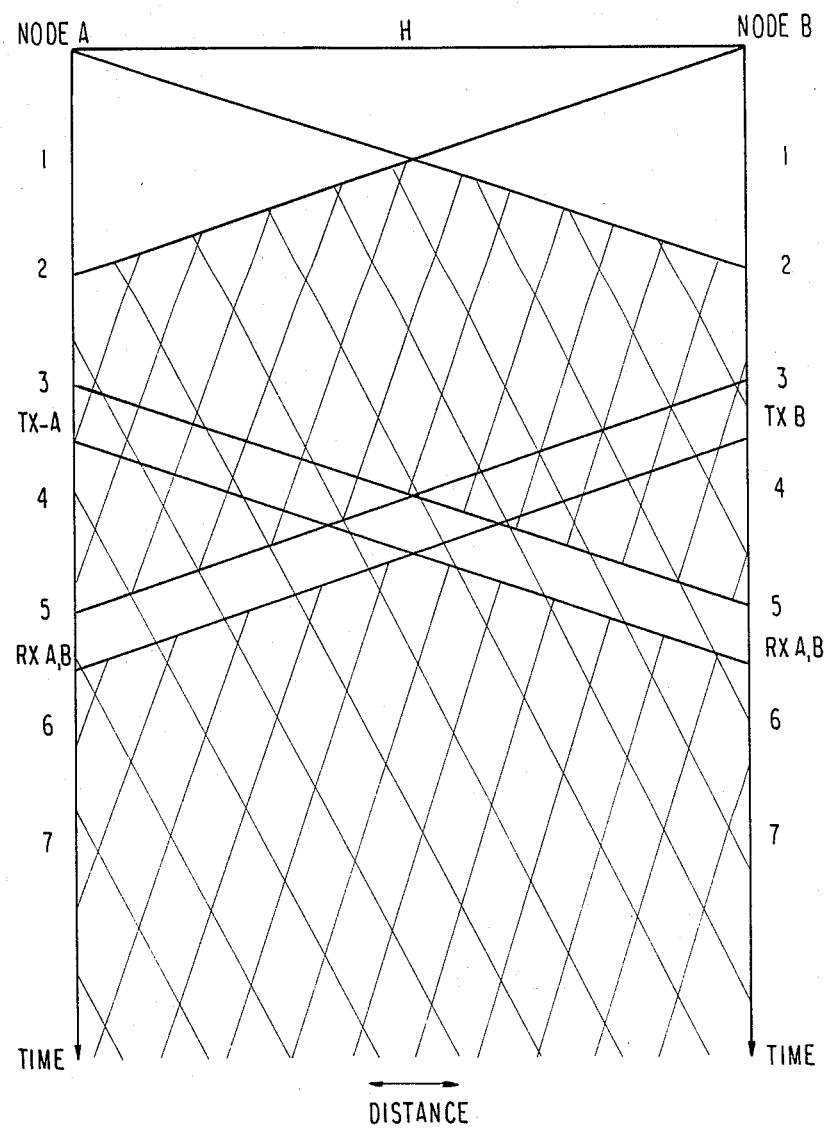
FIG. 5 is similar to FIGS. 2-4 excep that it shows how the second collision detection mechanism can be used to detect collisions of the type illustrated in FIG. 4.

FIG. 5 is drawn similar to FIG. 4 with one exception, FIG. 5 is drawn to illustrate the operation of the second collision detection mechanism at station B. Thus where station A inserts the transmission gap (as it would be inserted in the absence of the second collision detection mechanism), station B does not insert its transmission gap (on a basis which is to be described). As a result, station A's transmission gap is filled in and thus no station in the network will see the transmission gap expected and all stations will detect the collision.

FIGS. 6A and 6B illustrate an implementation of a typical station in accordance with one embodiment of the invention. As shown in FIG. 6A, each station provides for coupling a user device 5 (a source/sink of data) through a CSMA/CD controller 10 and an interface 100 to the communication medium M (not shown in FIG. 6A although represented by the transmit TX and receive RX signals).

The user device 5 and the CSMA/CD controller 10 can be constructed in accordance with conventional techniques and these elements are not further disclosed. In particular, the user device 5 provides data for transmission and accepts data for receipt, along with appropriate control signals to/from the CSMA/CD controlle 10 to indicate a quiescent state, a state in which the use device 5 is ready to transmit and a state in which the user device 5 is ready to receive. The CSMA/CD controlle 10, based on this information as well as other information provided by the interface 100, schedules transmissions, and provides data for transmission to the interface 100, accepts received data from the interface 100, ad provides it to the user device 5. The CSMA/CD controller 10 or the user device 5 may provide for the validation of received data based on conventional techniques. The interface 100 provides for the data transmission, along with a "normal" obligatory carrier gap and provides the CSMA/CD controll 10 with a collision detect signal to represent a collision. The CSMA/CD controller also obtains information from interface 100 about the presence of carrier on the cable in order to schedule transmissions.

The interface 100 is shown in more detail in FIG. 6B. As shown in FIG. 6B the interface 100 includes five major components, a modulator 105, a demodulator 110, a receive buffer and control logic 120, a collision detector 130 and a transmit buffer, timer and control 140. The functions of the modulator 105 and demodulator 110 have already been described, and inasmuch as they are conventional no further description is necessary. The receive buffer and control logic 120 accepts receive data and a carrier detect signal from the demodulator 110. The receive data may be buffered and a control signal indicating the present of received data may be provided to the CSMA/CD controller 10 (not illustrated). The receive buffer and control logic 120 also provides a copy of the receive data to the collision detector 130.

The collision detector 130 includes three major elements, a data collision detector 132, a carrier gap detector 131, and a collision logic 133. The receive data provided by the receive buffer 120 is one input to the data collision detector 132. The other input to the data collision detector 132 is transmit data provided from the CSMA/CD controller 10. The data collision detector compares its two inputs (after imposing a suitable delay on the transmit data) and provides a binary data collision detect signal to the collision logic 133. This binary collision detect signal indicates either the presence or an absence of a collision based on a comparison (bit by bit) of the transmit and receive data, respectively.

If the data collision detector 132 indicates the absence of a collision, then the collision logic 133 responds by controlling its collision logic (CL) output to indicate lack of a collision. If the test is not passed, that is if the bit by bit comparison during the period $T_1$ is failed, then the collision logic signal CL indicates the presence of a collision. This is provided as one input to the CSMA/CD controller 10, but more importantly provides an input to the transmit data buffer, timer and control 140.

The transmit data buffer, timer and control element 140 includes a transmit data buffer 141, a data detector 142 and a timer 143. When the CSMA/CD controller 10 provides data for transmission, the presence of that data is detected by detector 142 and initiates timer 143. At this time data also begins flowing into the transmit data buffer 141. The transmit data buffer 141 may be controlled such that there is little or no delay provided to the data and thus data almost immediately flows to the modulator 105. The presence of the data detect signal at 142 partially enables gate 146.

The timer 143 is provided for timing the beginning and duration of the carrier gap, e.g. the times $T_1$ and $t_G$. Initially the output of the timer 143 is low, providing a low output of the AND gate 144 which, after being inverted by inverter 145, provides a high input to fully enable gate 146 (in the presence of data). This generates the carrier on signal enabling the modulator 145 to provide data modulated carrier to the communication medium. When the timer first expires, its output goes high. If at this time the output of the collision logic 133 is also high (indicating the absence of a collision) then the outputs of the AND gate 144 and inverter 145 switch so that gate 146 is disabled. This terminates the carrier and begins the carrier gap. When timer 143 again expires (at the expiration of the period $t_G$), then its output again goes low, switching the outputs of gate 144 and inerter 145 to again fully enable the gate 146 to again provide the carrier on signal. On the other hand, if the collision logic or collision enforcement CL is low then the gate 146 is not disabled and no carrier gap is created.

The carrier gap detector 131 includes two timers, each timing out predetermined durations. The first timer responds to an off/on transition in the carrier detect signal from the demodulator 110 to begin timing out the period $T_1$ (see FIG. 1C). On expiration of the first timer, the carrier gap detector 131 checks the carrier detect signal. Normal operations requires that at that time the carrier detect signal indicate the absence of carrier. Expiration of the first timer initiates the second timer and the comparator. The comparator checks the carrier detect signal until the second timer expires. The second timer times the gap duration $t_G$. If throughout this period (the period $t_G$ beginning at a time $T_1$ subsequent to the off/on transition in the carrier detect signal), the comparator continuously sees the absence of a carrier detect signal, then the carrier gap detector 131 indicates the carrier gap test has been passed, e.g. the carrier gap has actually been seen. Thus the carrier gap detector 131 provides a binary carrier gap signal reflecting the presence or absence of the expected carrier gap. The collision detect signal is provided to the CSMA/CD controller.

Optionally, during the period when the first timer is timing (from initiation of transmission through the period $T_1$) a data collision detect window defined by a signal on conductor 134 may be employed to gate the data collision detector 132, since it is only during this period that the bit by bit comparison is necessary. Actually the window need extend only through the source address (or other unique bit pattern).

In a preferred embodiment of the invention, the network employs a 2 Mb/sec transmission rate, angle modulation (either FSK or PSK), HDLI encoding for physical layer (MAC) signalling and IEEE 802.3 Medium Access Control framing. Encoding is NRZI with zero insertion after any five consecutive ones, except in flags. Zeros are transmitted as a transition (phase or frequency change) and ones are no transition. The transmit frame delimiters (EOF) are the standard HDLC flag, 01111110. Based on these parameters, and employing the invention, we expect that cable plant distance of more than 6 MK from the head end can be accommodated.

The proposed packet includes a preamble of 8 bytes, followed by 12 bytes of destination and source address. These 20 bytes (160 bits) are defined as the bit comparison interval (previously referred to as $T_1$) Tbc. To accommodate bit stuffing, we expand the bit comparison interval to 179 bits (Tbc').

The minimum length of our packet is:

$$TX \text{ Packet}(MIN) = Tbc' + Tdy + Tjt \quad (1)$$

where $$Tdy = Ttx + Trt + Trx + Tca \quad (2)$$

where:

Ttx is the hardware delay through the transmitter,

Trt is the maximum round trip cable system delay including the head end delay (The), Trx is the hardware delay through the receiver to the bit comparison point, Tca is the collision alert delay to signal a collision to the CSMA/CD controller, and Tjt is the additional "jam" transmission length and may be zero.

After this delay $(Tbc' + Ttx + Trt + Trx + Tca)$, if the bit compare is passed transmission is terminated for a slot interval (previously referred to as $t_G$) Ts1. This interval is just long enought to turn off the transmitter in a controlled manner (Tof), allow a period of silence in the packet that all receivers can detect (Too), turn on the transmitter in a controlled manner (Ton), and transmit synchronization bits (if used) to allow reacquisition at all receivers (Tac). Thus:

$$Tsl = Tof + Too + Ton + Tac \quad (3)$$

The end of the acquisition pattern (Tac) is a unique word that signals resumption of data transmission. Note that Tac is optional.

If bit compare failed, the transmitter continues transmission one jam time (Tjt), then ceases transmission. In order to adequately "fill on" the slot:

$$Tjt \geq Tof + Too \quad (4)$$

where:

Tjt is the controller jam time, and is normally 32 bits.

Receiving stations count bits to the end of the delay time and then look for absence of energy in the slot. Three things can occur:

a. No energy is seen—this implies the transmitting stations saw not bit errors, transmitted the slot and no other station has collided and filled the slot, b. Energy is seen because a colliding transmission filled the slot. This occurs when colliding transmissions reach the head end offset in time by approximately one slot interval or more. This is analogous to physical collision detection.

c. When two transmissions reach the head end at approximately the same time, energy is seen because at least one transmitter saw bit erros and "jammed" the slot.

There are three conditions that must be met for all possible collision scenarios.

Condition 1: The slot must occur late enough that the latest possible collision, i.e. the maximum time offset between the arrival of two transmissions at the head end will fill the slot. This time is the sum of the hardware delays and the maximum round trip propagation delay.

Condition 2: For cases where the two colliding slots overlap, the slot must be transmitted after the station has completed logical collision detection by bit comparison.

Condition 3: Each collided transmission must be at least a minimum length necessary to fill the slot of the colliding transmission, irrespective of their time displacement.

While these three conditions must be simultaneously fulfilled, they are not independent. For example, if the bit comparison time guarantees Condition 1 is fulfilled, then Condition 3 is also met.

Collision Scenario 1

Both transmitters are at the extremes of the cable plant, as shown in FIG. 7. Transmitter A transmits first, and transmitter B transmits just before A's transmission arrives at B.

The following sequence of events occurs in this scenario.

1. A begins transmitting.

2. After one round trip plus hardware delay, A's transmission arrives at both A and B. Simultaneously, B begins transmitting.

3. Both A and B begin bit comparison on the same, A's, data.

4. A completes bit comparison with no bit errors. A inserts the slot in its transmission. Both conditions 1 and 2 are satisfied in this scenario: The slot is late enough to guarantee that B's transmission will fill it in, and the slot occurs after bit comparison.

5. B has detected a bit compare error, because the receive data (A's) cannot match B's transmitted data. As soon as an error is detected, B could alert the CSMA/CD controler. Condition 3, however, requires that transmission continue long enough to fill in the slot no matter what the offset between colliding transmission may be. Therefore, alerting of the CSMA/CD controller is delayed until Tdy+Tbc' after the beginning of B's transmission. The CSMA/CD controller then jams and transmission ceases. In this scenario, the bit error detected by B is not required for perfect collision detection because:

6. When A's slot reaches the head end, B's transmission fills it. All interfaces will see energy in the slot.

7. When the filled slot reaches A, A detects the collision and alerts the CSMA/CD controller.

8. The CSMA/CD controller jams for Tjt, then ceases transmission. The end of A's transmission propagates around the cable system and arrives at A and B. The maximum collision fragment is shown on the figure.

Collision Scenario 2

When A is located near the head end and B is located at the extreme of the cable plant, we have the siutation displayed in FIG. 8. Hnece, we assume that B transmits before A such that B's transmission arrives at A just as A begins transmitting. We further assume that B's transmission is stronger than A's; B's transmission will not be corrupted by A's transmission.

The following sequence of events occurs:

1. B begins transmitting.

2. Just as B's transmission arrives at A, A begins transmitting.

3. A receives B's transmission and begins bit comparison.

4. After the hardware and head end delays, A's transmission arrives at A, but becuase it is weaker, does not cause data errors.

5. A performs bit comparison and detects an error on the last bit, Tbc' later.

6. Meanwhile, B receives its own transmission plus that of A and begins bit comparison. Because A is weaker than B, B does not detect errors.

7. A, upon detection of the bit comparison error, delays the alerting of the CSMA/CD controller until Tbc'+Tdy has elapsed from the start of A's transmission, as in collision scenario 1.

8. A alerts the CSMA/CD controller, which jams. The slot which could normally have been transmitted is filled in by the jam sequence.

9. Because B's slot could overlap A's slot (the arrivals of the two transmissions were nearly coincident), the jam sequence is necessary to ensure that slot is filled.

10. The filled slot propagates to all units, enforcing the collision.

11. B, upon detecting energy in the slot, alerts the CSMA/CD controller which jams. the end of this jam time defines the end of B's collision fragment.

From the figures, we see that the maximum collision fragment is the same as for scenario 1.

The preceding has described an embodiment of the invention wherein violation of the gap is distributed among a plurality of remote stations. As has been described above, however, this function may be centralized (for example in the head end equipment). Centralizing the gap violation detector minimizes equipment duplication since only a single gap violation detector is required, as opposed to requiring a copy in each of the distributed stations. At the same time, when the gap violation detector reports that the gap has been properly detected, the gap itself can be eliminated. More particularly, FIG. 9 shows the head end equipment for detecting the gap presence and for eliminating the gap when its presence has been detected, as FIG. 10 shows a typical interface 100; as will be described below, the interface 100 shown in FIG. 10 differs form the interface 100 shown in FIG. 6B in that the carrier gap detector 131 (of FIG. 6B) has been eliminated from the interface of FIG. 10.

More particularly, as is shown in FIG. 9, the head end equipment includes a receive 300, including a demodulator 310 and a receive buffer and control logic 320. The output of the demodulator 310 is also provided to a carrier gap detector 330, which may be similar to the carrier gap detector 131 of FIG. 6B. More particularly, based on the particular gap rules then in effect (particularly the location of the gap in a transmission), the carrier gap detector 330 monitors the output of the demodulator 310 so as to determine whether or not the gap has been violated. Of course, such a violation is indicative of a collision. Assuming that the gap has not been violated, then the gap detecto 330 provides a corresponding signal to the receive buffer and control logic 320. The receiver fubber and control logic provides a delay sufficient to cover the gap. That is more particularly, on receipt of data from the demodulator 310, the data is stored and not immediately transmitted. Once sufficient data has been stored, the transmission of which takes a period of time equal to the gap itself, data is read out of the buffer 320 and provided to the transmitter 350, where it is modulated onto the communication medium. When the carrier gap detector 330 determines that the gap is present, it enables the receive buffer and control logic to continue transmitting, continuously, so that the gap is eliminated.

On the other hand, if the carrier gap detector 330 determines that the gap has been violated, then it may inhibit or clear the buffer 320 and initiate a code violation generator 340. The code violation generator 340 is arranged to transmit a data sequence which violates predetermined code rules. This data sequence is transmitted only long enough to ensure that it is detected by the stations monitoring the communication medium. When these stations receive a transmission with a code violation, the transmission is discarded just as it would be if a receiving station detected a collision. For those receiving stations, which are also transmitting, receipt of a code violation is construed to be evidence of a collision. These stations are arranged so that they continue transmitting long enough to continue past where the slot would have been inserted had no collision been detected, adn then to terminate that transmission. The clock violation can be as simple as transmitting a bit for 150% of a bit time (e.g. eliminate the bit transition at the appropriate time. Other code violations can be an abort sequence such as the HDLC abort sequence.

As indicated above, the invention works in an almost identical fashion with free space communication media, as it does with guided wave communication media (coaxial cable, twisted pair or optical fiber or the like). In an embodiment of the invention employing free space propagation, the topography of FIG. 1B is implemented by providing a common channel (such as a particular carrier frequency) upon which all outlying stations transmit to a head end station, and a second channel (a different carrier frequency) upon which the head end transmits to the outlying stations. The topography of FIG. 1A is implemented by providing a single communication channel (carrier frequency) on which all stations transmit and receive.

Although we have indicated that the carrier gap is located a predetermined time from initiation of transmission both the predetermined time as well as the beginning of the transmission could be further defined. Marking the beginning of transmission by following the carrier sense signal is not particularly accurate, it can take several bit times for this signal to be asserted and the number of bit times can vary with receive level. To overcome this potential source of inaccuracy, it is known to use a STI word (similar to the TDMA unique word) to mark the beginning of a transmission. Thus, where we have indicated that timing the slot location is referenced to the beginning of transmission it should be understood that we means this terminology to encompass timing based on carrier sense or detection of the STI. Further, while the gap is located at a "predetermined time" or location in the transmission, there is no reason why this time needs to be fixed. If the predetermined time is variable some mechanism must be included to identify the time. The time can be identified in the STI word, or any other portion of the transmission which precedes the gap.

Furthermore, while the preferred embodiment is illustrated in a broadband network (and this employs carrier modulation) the invention can be applied in baseband networks as well. In that event the carrier sense detector and signal are replaced by a transition detector seeing level transitions.

A more complex collision scenario than the example described above suggests that the transmissions should be scrambled. More particularly, assume three transmissions are so placed on the medium that they collide; of the three one is clearly stronger than the other two. One would expect to have the two weaker signals fill the gap of the stronger and make the collision readily evident. However, it is possible for the two weaker signals to cancel sufficiently so they are not detected, circumventing the first collision detection mechanism. One factor on which the degree of cancellation is dependent is the relationship of data patterns; the greater the similarity, the greater is the potential for cancellation. To reduce the similarity we can scramble the transmission, using a conventional scrambler such as the one referred to in U.S. Pat. Nos. 4,383,322 and 4,355,388.

Those skilled in the art will understand that the characteristics and components of the particular embodiments described hereinafter are merely exemplary, to aid in teaching those skilled in the art how to make and use the invention, but that many changes can be made to the embodiments particularly described within the spirit and scope of the invention, which is to be determined by the following claims.

We claim:

1. A broadband Carrier Sense Multiple Access with Collision Detection (CSMA/CD) network including:
   a plurality of stations communicating via a communication medium, each of said stations including:
   an interface coupled between said medium and CSMA/CD controller, said interface including transmitter means for transmitting onto said medium, said transmitter means including timing means for inserting a gap into a signal transmitted onto said medium at a predetermined location in each transmission,
   said network including at least one receiving means for receiving from said medium, and providing a receiver output representing a signal received from said medium,
   gap detecting means responsive to said receiver output for providing a collision detect signal in the event said receiver output fails to include said gap,
   wherein said at least one receiving means and said gap detecing means is located at a head end location.

2. The broadband CSMA/CD network of claim 1 in which each said interface also includes receiving means and gap detecting means, said gap detecting means providing said collision detect signal to said CSMA/CD controller.

3. The broadband CSMA/CD network of claim 1 in which said head end location also includes gap stripping means for eliminating said gap from those transmissions through said head end in which a gap is detected.

4. The broadband CSMA/CD network of claim 2 in which said interface also includes:
   comparison means for comparing transmitted and received inforamtion and for providing a data collision detect signal in the event of a lack of comparison, and
   means to inhibit insertion of said gap into a transmission in response to said data collision detect signal.

5. The broadband CSMA/CD network of claim 1 in which said interface includes station receiving means and wherein said communication medium comprises an electrical conductor and includes a transmit conductor coupled between outputs of said transmitter means and an input at said head end location and a receive conductor connected between an output at said head end location and inputs of said station receiving means.

6. The broadband CSMA/CD network of claim 1 in which said communication medium is an optical fiber.

7. The broadband CSMA/CD network of claim 1 in which said communication medium is a free space.

8. The broadband CSMA/CD network of claim 1 in which said communication medium includesa pair of unidirectional channels, a first channel coupling said transmitter means to a common location and a second channel coupling said common location to each of said stations.

9. In a broadband Carrier Sense Multiple Access with Collision Detection (CSMA/CD) network including a plurality of stations communicating via a communication medium, each of said stations including an interface coupled between a CSMA/CD controller and said medium, said interface including:
   transmitting means for transmitting onto said medium;

receiving means coupled to receive from said medium, and collision detecting means coupled to both said transmitting and said receiving means, said collision detecting means comparing data for transmission with data output by said receiving means and for detecting a collision in the absence of a predetermined relationship therebetween, and means responsive to lack of a collision detection for inhibiting transmission by said transmitting means at a predetermined point in a transmission to generate a transmission gap.

10. The broadband CSMA/CD network of claim 9 which further includes:

gap detecting means responsive to signals from said medium for providing a collision detect signal in the event a transmission does not exhibit said transmission gap.

11. The broadband CSMA/CD network of claim 10 in which said network includes a gap detecting means associated with each receiving means, and in which each said receiving means includes collision logic means responsive to said gap detecting means and said collision detecting means for providing an indication of a collision in the event either said gap detecting means or said collision detecting means detects a collision.

12. The broadband CSMA/CD network of claim 10 in which said gap detecting means is located in a head end of said network.

13. A transmitter for a broadband Carrier Sense Multiple Access with Collision Detection (CSMA/CD) communication network including:

a carrier generator, timing means for timing a predetermined period from initiation of a transmission, logic means for controlling an operating condition of said carrier generator and responsive to expiration of said period and to an indication from a collision detector representing lack of collision detection for inhibiting said carrier generator for a predetermined duration beginning at the expiration of said predetermined period.

14. The transmitter of claim 13 in which said collision detector includes means to compare information transmitted by said transmitter with information received from said CSMA/CD communication network and to signal lack of collision detection if said comparison reveals a predetermined relation therebetween.

15. An interface for a station in a broadband Carrier Sense Multiple Access with Collision Detection (CSMA/CD) network coupled between a communicating medium of said network and a CSMA/CD controller, said interface including:

transmit controlling means responsive to a transmit enable signal from said CSMA/CD controller and to transmit data, for generating a carrier on control signal and for coupling transmit data to modulator means, modulator means responsive to said carrier on control signal and to said transmit data, and coupled to said communication medium, for energizing a carrier generator and modulating an output of said carrier generator with said transmit data to thereby provide a data modulated carrier to said communication medium, a data buffer, a demodulator reponsive to data modulated carrier signals detected on said communication medium for providing a carrier detect control signal and for also providing demodulated receive data to said data buffer, a data collision detector responsive to receive data from said data buffer and transmit data from said transmit controlmeans for providing a binary data collision signal indicating the presence or absence of a data collision, collision logic means responsive to said binary data collision signal for generating a collision enforcement signal in the presence of a binary data collision signal indicating the presence of a collision said transmit control means including a gap generator for inhibiting said carrier on signal at a predetermined point in a transmission to provide a gap in said data modulated carrier, and gap generator control means responsive to said collision enforcement signal for preventing operation of said gap generator.

16. The interface of claim 15 which further includes:

a carrier gap collision detector responsive to a carrier detect signal and to a carrier gap timer for providing a binary carrier collision detect signal indicating the presence or absence of a predetermined carrier gap in said carrier detect control signal, said collision logic means including means responsive to said carrier collision detect signal for generating a collision signal in the presence of either a binary data collision signal indicating the presence of a collision or a carrier collision detect signal indicating the absence of said predetermined carrier gap.

* * * * *